April 5, 1949. H. J. PETERSON 2,466,270
ANIMAL TRAP
Filed Oct. 16, 1944 2 Sheets-Sheet 2
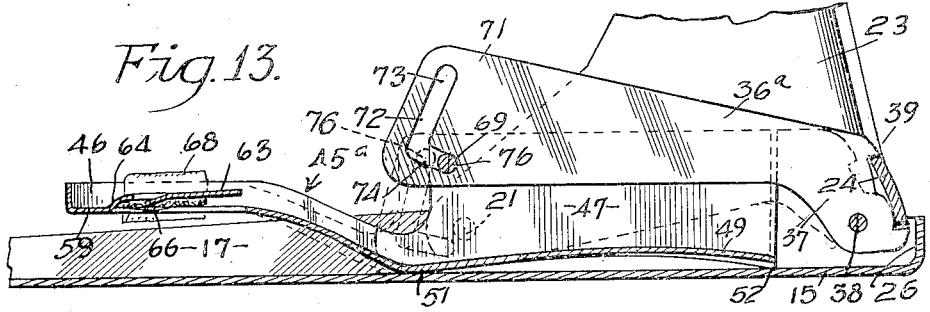
Fig. 13.
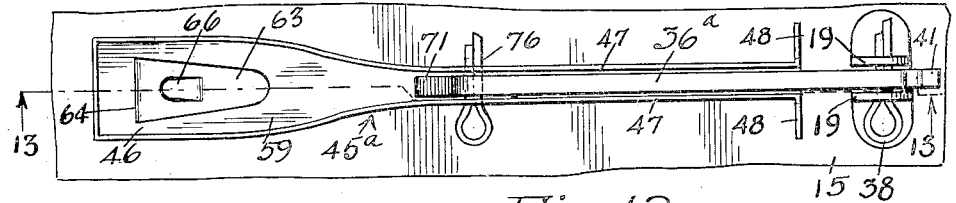
Fig. 12.
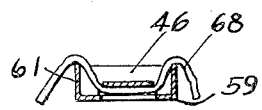
Fig. 7.
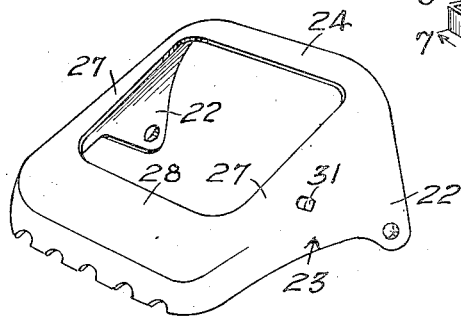
Fig. 11.
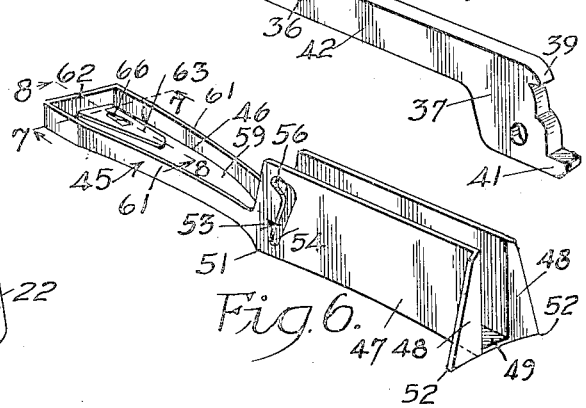
Fig. 5.
Fig. 6.
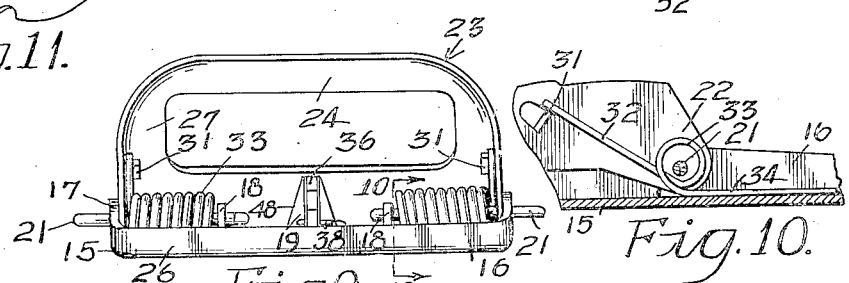
Fig. 8. Fig. 9. Fig. 10.
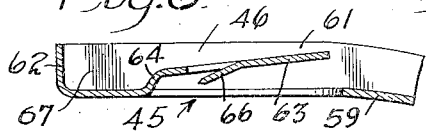
INVENTOR
HENRY J. PETERSON
Rudolph L. Lowell
by
att Patented Apr. 5, 1949

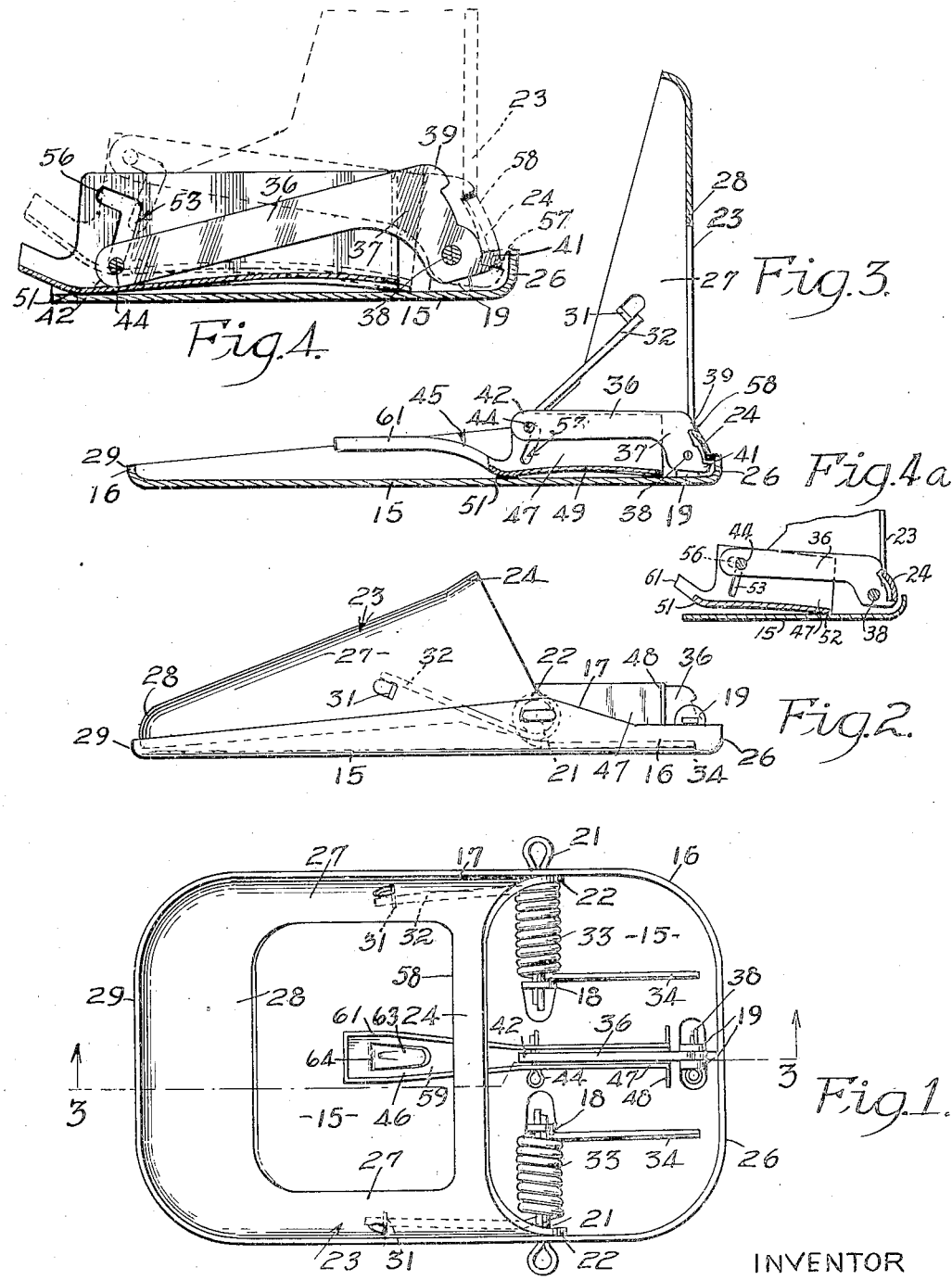

2,466,270

UNITED STATES PATENT OFFICE 2,466,270
ANIMAL TRAP
Henry J. Peterson, Webster City, Iowa
Application October 16, 1944, Serial No. 558,885
9 Claims. (Cl. 43—83.5)

This invention relates generally to animal traps and in particular to a trap for rats and mice, which is automatically set on movement of the jaw from a released position to a set position therefor.

Traps generally used for catching rats and mice are designed to provide for a sensitive or ready release of a spring actuated jaw to an animal catching or capturing position. In many of these traps, however, the sensitive release of the spring jaw is accomplished at a sacrifice in the safe setting of the trap so that oftentimes the trap is sprung while in the hands of the trap user, or on a slight jarring of the trap in setting it on a floor surface.

Another objection to traps of this type in common use is found in the fact that the spring actuated jaw is movable through an angle of substantially 180° from a latched position to a sprung position. By virtue of this relatively large angular travel of the jaw a rat or mouse is warned of impending danger and often able to move out of the trap before the jaw reaches a sprung position.

Yet a further disadvantage in these traps is the fact that the bait holding portion of the trap is generally incapable of securely holding a bait material whereby the bait is removed from the trap without the trap being sprung. This difficulty is usually overcome by tying or otherwise securing the bait in the bait holder with string or the like, but this procedure is generally inconvenient and as a result is oftentimes left undone.

It is an object of this invention, therefore, to provide an improved animal trap.

Another object of this invention is to provide an animal trap in which a spring actuated pivoted jaw is automatically set on its movement into a set position and releasably but positively held against premature or accidental release.

Yet a further object of this invention is to provide an animal trap in which a pivoted trap jaw is movable through a complete angular distance of substantially 90° and, when sprung, has substantially the complete periphery thereof in a closed relation with the trap base.

A still further object of this invention is to provide an all metal animal trap which is compact, comprised of a relatively few number of parts having wide manufacturing tolerances, capable of being assembled without the use of tools or jigs, and efficient in operation.

Yet another object of this invention is to provide an animal trap having a bait member with a bait holding portion of a construction adapted to hold the bait against being stolen from the trap by an animal.

A feature of this invention is found in the provision of an animal trap having a bait member resting on the trap base and guidably connected with a pivoted trigger member for gravity movement longitudinally of the trigger, at an upper pivotally moved position of the trigger, to lock the trigger in a jaw setting position. The trigger is moved to a jaw setting position concurrently with a movement of the jaw to a set position.

Further objects, features and advantages of this invention will become apparent from the following description when taken in connection with the accompanying drawings in which:

Fig. 1 is a plan view of the animal trap of this invention showing the jaw in a sprung position;

Fig. 2 is a side elevation of the trap with the jaw in a sprung position;

Fig. 3 is a longitudinal sectional view of the trap taken on the line 3—3 in Fig. 1 but showing the jaw in a set position;

Fig. 4 is an enlarged detail view, partly in section, showing the assembly of the bait member and trigger member in the trap of Fig. 1;

Fig. 4a is a reduced detail view, illustrated similarly to Fig. 4 and showing the bait member and trigger member in changed positions relative to their showing in Fig. 4;

Fig. 5 is a perspective view of the trigger member shown in Fig. 4;

Fig. 6 is a perspective view of the bait member shown in Fig. 4;

Fig. 7 is a sectional view taken along the line 7—7 in Fig. 6;

Fig. 8 is a sectional view as seen on the line 8—8 in Fig. 6;

Fig. 9 is a rear end elevation of the trap looking toward the left in Fig. 1;

Fig. 10 is a fragmentary sectional view taken on the line 10—10 in Fig. 9;

Fig. 11 is a perspective view of the trap jaw;

Fig. 12 is a fragmentary plan view of a modified form of trigger member and base member assembly; and Fig. 13 is a sectional view taken on the line 13—13 in Fig. 12.

With reference to the drawings the animal trap of this invention is shown in Figs. 1 and 2 as including a sheet metal base member 15 integrally constructed with an upturned marginal flange 16 having upwardly sloped oppositely arranged sides 17. A pair of transversely spaced lugs 18 are punched upwardly in the base 15 between the high spots of the upwardly sloped sides 17. A second pair of transversely spaced lugs 19 are punched upwardly in the base 15 adjacent the base rear end and inwardly of the lugs 18 for a purpose which will appear later.

Extended through each high spot of an inclined or sloped flange side 17 and an adjacent lug 18 is a pivot pin 21, illustrated in the drawings as a cotter key, for pivotally supporting a leg or lateral projection 22 of a spring actuated jaw 23 of an open integral construction and of a generally arched form (Figs. 9 and 11). The free ends of the jaw legs or projections 22 are pivoted on a corresponding pin 21 adjacent a corresponding flange side 17. The free ends of the jaw legs 22 are connected together by a curved transverse member 24. As shown in Fig. 3 the jaw legs 22 are of a length substantially equal to the distance between the pivot pins 21 and the rear side 26 of the base flange 16 so that when the jaw is in an upright or set position, the transverse leg connecting member 24 is curved upwardly and inwardly of the trap and adjacent the inner edge of the flange rear side 26.

Extended longitudinally from the free ends of the jaw legs 22 is a U-shaped member formed with curved legs 27 which, on movement of the jaw 23 to a sprung position, are adapted to close against the base 15. The legs 27 are of a length such that when the jaw is in a sprung position the closed end 28 of the U member is adjacent the inner surface of the front side 29 of the base flange 16 and against the base 15, with the legs 27 being adjacent the inner surface of the flange sides 17 between the flange front side 29 and the pivot pins 21 (Figs. 1 and 2). As a result when jaw 23 is in a sprung position the lower marginal edge thereof is in a closing relation with the base 15.

Each leg 27 of the U member, adjacent a corresponding jaw leg 22, is formed with an inwardly punched out lug 31 adapted for abutting engagement with one end 32 of a coil spring 33 mounted about a pivot pin 21 between a lug 18 and a corresponding jaw leg 22. The opposite end 34 of a spring 33 is extended rearwardly on the base 15 and is flat against the base over substantially the complete length thereof as shown in Fig. 10. It is seen, therefore, that the pair of springs 33 are oppositely arranged in a spaced relation between the legs 22 of the jaw 23. On movement of the jaw 23 to a set position a pressure is stored in the springs 33, which pressure is released when the trap is sprung to move the jaw into a closed position with the base 15.

The springs are of a like construction so as to be interchangeable with each other. Further, the end portions 32 and 34 of the springs are of the same length so that a spring is reversely interchangeable in its assembly in a trap. In other words the rear end portion 34 of a spring 33 can be positioned against a lug 31, and a front end portion 32 can be positioned against the base 15 to actuate the jaw 23 in all respects as described above. As previously mentioned the rear end portions 34 of the springs 33 are flat against the base over substantially their full length (Fig. 10). As a result any pressure exerted by a spring 33 is applied on the base 15 over a relatively large bearing surface whereby any deformation of the base 15, which might occur if the pressure were applied on the base only at the free end of the spring portion 34, is entirely eliminated. As a result the base member 15 may be formed of a relatively thin sheet material.

The jaw 23 is releasably held in a latched or set position by a trigger mechanism including an upright trigger member 36 of a substantially L-shape having the free end of its short leg 37 positioned between the lug members 19. The trigger 36 is pivotally supported on a pin 38 projected through the lugs 19 and through an opening in the leg 37. The rear side of the short leg 37 is formed with a pair of rearwardly extended angularly spaced projections 39 and 41. The free end of the longer leg 42 of the trigger member 36 is provided with an opening 43 adapted to receive a pin 44 for a purpose which will be later explained.

A bait member 45 is integrally formed with a bait holding front portion 46 and an upright channel rear portion 47. The channel 47 is integrally formed at its rear end with a pair of oppositely arranged laterally extended brace portions 48, the bottoms of which are sloped upwardly and inwardly for junction with the bottom 49 of the channel 47. The bottom 49 in turn is curved upwardly and downwardly longitudinally of the channel 47 so as to provide a low spot or bearing 51 at the junction of the channel 47 with the bait holding portion 46 which is extended upwardly and forwardly from the low spot 51. As a result the bait member is adapted to rest on the base member 15 in a three point contact, namely, the low spot 51 and at the outer lower ends 52 of the lateral extensions 48.

The sides of the channel 47 rearwardly of the low spot 51 are formed with oppositely arranged slots 53 each of which includes an upwardly and rearwardly extended slot portion 54 having a forwardly and upwardly extended slot portion 56 open to and in communication with the upper end thereof.

In the assembly of the trigger mechanism the longer leg 42 of the trigger member 36 is positioned within the channel 47 with the opening 43 in alignment with the slots 53. The pin 44 is extended through the aligned slots 53 and the opening 43 with the opposite ends of the pin 44 being guidably movable in the slots 53. It is seen, therefore, that the bait member is movably supported on the base 15 and guidably supported by the trigger member 36 against lateral movement, while permitting a pivotal up and down movement of the trigger member 36 within the channel 47.

In the operation of the trigger mechanism, assume the trap to be in its sprung position shown in Fig. 2, so that the bait member 45 and the trigger member 36 are in their full line positions shown in Fig. 4. With the trap held so as to be either level, or inclined upwardly from its rear end, the jaw 23 is pivotally moved upwardly to its set position shown in Fig. 3 so that the lower side 57 of the transverse connecting member 24 engages and moves the trigger rear extension 41 whereby the leg member 42 is moved upwardly within the channel 47 of the bait member. During this pivotal movement of the leg member 42 the pin 44 is moved upwardly against the top edge of the slots 53 so that on a continued upward pivotal movement of the leg member 42 to a position defined by the engagement of the projection 41 with the base member 15, the front portion 46 of the bait member 45 is raised and the bait member 45 is supported on the base 15 only at the ends 52 of the extensions 48, whereby the bait member is longitudinally moved rearwardly, by the action of gravity, and the pin 44 is received within the lateral slot extensions 56, as shown in dotted lines in Fig. 4.

Concurrently with the pivotal movement of the trigger member 36 and the resultant longitudinal rearward movement of the bait member 45 to position the pin 44 within the upper slot extensions 56, the rearward extension 39 on the trigger member is moved into the path of travel of the connecting member 24 as illustrated for the dotted line position of the trigger member in Fig. 4. As a result, on initial movement of the jaw 23, in a counter-clockwise direction from its dotted line position shown in Fig. 4, the upper side 58 of the connecting member 24 engages the projection 39 (Fig. 3). By virtue of this engagement, and the pressure of the springs 33 acting to move the jaw 23 in a counter-clockwise direction, as viewed in Fig. 3, the leg 42 of the trigger member 36 is urged in a counter-clockwise direction. However, with the pin 44 located in the slot extensions 56, and with the forward end of the slot extensions 56 being located rearwardly of the forward contact point 51, the trigger 36 is releasably locked against downward pivotal movement, to in turn releasably lock the jaw 23 against movement to a sprung position.

Due to the spaced relation of the rear contact portions 52 on the channel 47 the bait member 45 is positively held against any lateral wobbling action due to the pressure exerted thereon through the pin 44. It is to be noted also that the pin 44 is entirely within the confines of the slot extensions 56 to provide a relatively large bearing surface between the trigger member 36 and the bait member 45. Likewise, the full width of the top surface 58 of the connecting member 24 is in engagement with the rear extension 39. It is thus apparent that the releasable connections for holding the jaw 23 in a set position are in complete and full bearing engagement with each other whereby to substantially eliminate any premature or accidental springing of the trap.

In the setting of the trap it is contemplated that the fingers of both hands be placed below the base 15 at the rear end of the trap and with the thumbs positioned on the upper surface 58 of connecting member 24. By applying pressure through the thumbs the jaw 23 is readily moved to its set position shown in Fig. 3, while the fingers and thumbs are at all times free from a position at which they can be caught within the trap, in the event the jaw 23 is released prior to its being latched in a set position. With the trap being automatically set on movement of the jaw 23 to a set position, and with a complete and full bearing engagement between the pin and slot connection in the trigger mechanism, and between the extension 39 and the connecting member 24, it is apparent that a maximum safety is provided for in the setting of the trap.

The trap is sprung on downward pivotal movement of the bait-holding portion 46. This downward pivotal movement, in conjunction with the location of the contact 51 forwardly of the front ends of the slot extensions 56, provides for a movement of the pin 44 out of the slot extensions 56 and into the upright portions 54 of the slots 53. On movement of the pin 44 within the upright slot portions 54 the leg 42 of the trigger 36 is pivoted downwardly, to in turn move the rear extension 39 out of an engaging position with the connecting member 24, whereby the jaw 23 is released and moved by the pressure of the springs 33 into an animal capturing position relative to the base 15.

In this connection it has been found that the jaw will be released without the bait holding portion 46 being immediately moved downwardly to a position at which the pin 44 is positioned within the slot portions 54. Oftentimes a mouse or a rat will dabble around with the bait before proceeding with eating or tugging on the bait. With each dabbling action the bait member 45 tends to move forwardly of the trap as a result of its slidable and pivotal support on the base member 15 at the contact point 51 and the downward pressure applied on the pin 44 through the trigger member 36. As a result on the completion of a plurality of dabbling actions the pin 44 is located within the upright slot portions 54 and the jaw sprung before any relatively heavy pulls or bites have been made on the bait.

In many traps of the prior art the effectiveness of the trap is reduced by virtue of the fact that the bait holding portion is incapable of properly holding the bait so as to prevent the bait being stolen without springing the trap. This objection to the prior traps is overcome in the present invention by the provision of a bait holding portion 46 capable of receiving and firmly holding cheese, bacon or like material.

Referring to Figs. 6, 7 and 8 the bait holder 46 is illustrated as including a base member 59 having upwardly extended side flanges 61 and a front flange 62. The base 59 is formed with a longitudinally extended lug 63 punched upwardly therein to a height below the top level of the side flanges 61, and with the fixed end 64 of the lug 63 adjacent the front flange 62. As best appears in Fig. 1 the sides of the lug 63 are tapered inwardly from the fixed lug end 64, and the lug 63 is of a width slightly less than the width of the base 59 between the side flanges 61. The lug 63 in turn is formed with a downwardly extended punched out lug 66, the free end of which is adjacent the fixed end 64 of the lug 63. When the trap is baited with cheese or like material, the cheese is pressed into a pocket 67 defined by the front flange 62, the raised fixed end 64 of the lug 63, and the portions of the side flanges 61 extended between the front flange 62 and the lug end 64. During the pressing of the cheese material within the pocket 67 portions thereof are extended about the fixed end 64 of the lug 63 to provide an anchor for holding the cheese within the pocket 67.

In the use of a bacon strip or like material indicated at 68 in Fig. 7, the strip material is inserted beneath the lug 63 and then moved forwardly to the fixed end 64 of the lug. During this forward movement the strip material is positioned ahead of the downwardly and forwardly extended lug 66 which serves as a guard or stop to prevent a rearward movement of the strip material. Also, by virtue of the fact that the lug 63 is below the top level of the side flanges 61 and of a tapered construction, the strip material is firmly wedged between the side flanges 61 and the lug 63, on movement of the material from the free end to the fixed end 64 of the lug. As a result of this construction of the bait holder 46, cheese, bacon or like material is firmly held in the trap and unable to be removed from the bait holder without the application of a force sufficient to spring the trap.

A modified form of trigger mechanism is shown in Figs. 12 and 13 which is similar in many respects to the trigger mechanism disclosed in Figs. 4, 5 and 6. Similar numerals of reference, therefore, will be used to indicate corresponding parts.

With reference to Figs. 12 and 13 the bait member 45a is similar in all respects to the bait member ber 45 in Fig. 6 except that aligned openings 69 in the channel 47, located rearwardly of the front contact 51, are substituted for the oppositely arranged pair of slots 53. The trigger member 36a is formed with a leg member 37 and rearward extensions 39 and 41 in all respects similar to the like parts of the trigger member 36 in Fig. 5. The forwardly projected extension or longer leg 71 of the trigger member 36a is formed at its front end with a slot 72 comprised of an upwardly and rearwardly extended slot portion 73 and a rearwardly and downwardly extended slot portion 74 open to the lower end of the slot portion 73.

In the assembly of the bait member 45a with the trigger member 36a the forward extension 71 is positioned within the channel 47, with the slot 72 in alignment with the openings 69. A pin 76 is then inserted through the aligned slot 72 and the openings 69 to pivotally connect the trigger member 36a with the bait member 45a, while providing for a longitudinal movement of the bait member relative to the trigger member.

In the operation of the trigger mechanism in Figs. 12 and 13 the connecting member 24 cooperates with the rear extensions 39 and 41 of the trigger member 36a in all respects the same as was previously described in connection with the cooperative action of the jaw 23 with the trigger member 36. On pivotal movement of the trigger member 36a to a position defined by the engagement of the rear extension 41 with the base member 15 the forward extension 71 of the trigger member 36a is initially pivotally moved relative to the bait member 45a to locate the pin 76 at the lower end of the upright slot portion 73. With the pin 76 in this position, and on a continued pivotal movement of the trigger forward portion 71, the bait member 45a is longitudinally moved rearwardly by the action of gravity to locate the pin 76 within the slot extension or recess 74. On engagement of the connecting member 24 with the rearward extension 39 the trigger forward extension 71 is held against downward pivotal movement by virtue of the location of the pin 76 within the slot extension 74.

On downward pivotal movement of the bait holding portion 46, the bait member 45a is pivoted about the contact 51, whereby to move the pin 76 within the upright slot portion 73. With the pin in the upright slot portion 73 the trigger forward extension 71 is released for downward pivotal movement to in turn release the connecting member 24 from its engaged position with the rear extension 39. The jaw is thus released from its latched or set position and moved into a closing position relative to the base 15 by the action of the springs 33.

From a consideration of the above description it is seen that the invention provides an animal trap of an all metal construction which is of a simple and compact design, comprised of but a relatively few number of parts, and adapted to be assembled without the use of any tools or jigs. The trap jaw 23 on its movement to a set or latched position, is releasably but positively held against movement to an animal capturing position, by a positive abutting engagement between the forward end of the channel 47 of the bait member and the forward end of the trigger member, and by the engagement of the trigger member extension 39 with the transverse member 24 of the jaw 23. As a result a high degree of safety against a premature or accidental release of the trap is accomplished without in any way sacrificing the sensitivity of the trap for a quick release by an animal acting on the bait holding portion 46 of the bait member. It is apparent, of course, that in attempting to remove the bait from the bait holding portion 46 the animal will tend to slide the bait member forwardly on the base member 15 whereby the release of the jaw 23 is accelerated.

Although the invention has been described with respect to preferred embodiments thereof it is to be understood that it is not to be so limited since modifications and changes can be made therein which are within the full intended scope of this invention as defined by the appended claims.

I claim:

1. In an animal trap comprising a base and a spring actuated pivoted jaw, means for releasably locking said jaw in a set position including a bait member adapted to rest on said base and having upright side portions, a trigger member pivoted at one end on said base and having the other end movably received between said upright side portions, with one of said two members having a slot therein formed with vertically and longitudinally extended portions, a pivot member on the other of said two members guidably movable in said slot, a rearwardly extended projection at said one end of the trigger member, said jaw, on movement to a set position, engaging said projection and pivotally moving the other end of said trigger member upwardly relative to said bait member, said bait member, when said pivot member is at the junction of said vertically and longitudinally extending portions, being inclined upwardly and forwardly so as to be movable by gravity in a rearward direction to provide for the reception of said pivot member within said longitudinally extending slot portion, and a stop at said one end of the trigger member spaced upwardly from said projection and engageable with the jaw to hold the jaw in a set position, with said jaw being released on movement of said bait member to dislodge said pivot member from said longitudinally extending slot portion.

2. In an animal trap comprising a base and a spring actuated pivoted jaw, means for latching said jaw in a set position including a bait member adapted to rest on said base and having an upright portion, a trigger portion pivoted at one end on said base for pivotal movement of its other end relative to said upright portion, with one of said two portions having a slot therein formed with connected longitudinally and vertically extending sections, a laternal projection on the other of said portions movable within said slot on pivotal up and down movement of said trigger portion, said bait member, when said lateral projection is at the junction of said longitudinally and vertically extending sections, being inclined upwardly and forwardly so as to be moved rearwardly by gravity longitudinally of said trigger member to position said lateral projection within said longitudinally extending section whereby to hold said trigger portion against downward pivotal movement, means on said trigger portion engageable with said jaw, on pivotal movement thereof to a set position, to pivotally move said trigger portion to locate said lateral projection at said junction, and a stop on said trigger portion engageable with said jaw to releasably latch the jaw in a set position.

3. In an animal trap comprising a base and a spring actuated pivoted jaw, a bait holder having a U-shaped member at one end adapted to rest on said base, a trigger member for releasably holding said jaw in a set position pivoted at one end on said base, and having the other end thereof pivotally movable within said U-shaped member, with one of said members having a slot therein formed with longitudinally and vertically extending portions, a lateral projection on the other of said members slidably movable in said slot, said projection, when said trigger member is in an upwardly moved position, being located at the junction of said longitudinally and vertically extending portions, and said bait holder, with the projection at said junction being inclined upwardly and forwardly so as to be movable by gravity longitudinally of said trigger member to position said projection in the longitudinally extending slot portion whereby to hold the trigger member against downward pivotal movement, and a pair of spaced rearwardly extended portions at said one end of the trigger member, with one of said rearwardly extended portions being engaged by said jaw, on pivotal movement to a set position, to pivot the trigger member to said moved position, and the other of said rearwardly extended portions being engaged by said jaw to latch the jaw against pivotal movement out of a set position.

4. In an animal trap comprising a base and a spring actuated pivoted jaw, a bait holder having an upright channel member adapted to rest on said base, an upright trigger member movable in said channel member and having one end projected rearwardly from said channel member, means pivotally connecting said one end on said base for pivotal up and down movement of said trigger member in said channel member, with one of said two members having a slot therein formed with longitudinally and vertically extending portions, a transverse pin on the other of said two members slidably movable in said slot, and a pair of rearwardly projected spaced extensions on said one end of the trigger member, with one of said extensions being engageable by said jaw, on pivotal movement thereof in one direction to a set position, to pivotally move said trigger member upward to locate said pin at the junction of said longitudinally and vertically extending slot portions, whereby said bait member is inclined upwardly and forwardly so as to be rearwardly movable by gravity longitudinally of said trigger member to position said pin within the longitudinally extending slot portion and hold said trigger member against downward pivotal movement, said jaw, on initial pivotal movement thereof in an opposite direction, being engaged and held by the second one of said extensions in a set position.

5. In an animal trap comprising a base, a spring actuated jaw, a bait member having an end portion adapted to rest on said base, a pair of spaced upright members on said end portion, a trigger member pivoted at one end on said base, and having the other end thereof movable between said upright members, a pin and slot connection between the other end of said trigger member and said upright members adapted to provide for an up and down pivotal movement of said trigger member between said upright members, and for an upward movement of the front end of said bait member as said trigger member approaches an upper pivotally moved position therefor, said bait member, when said trigger member is in an upper pivotally moved position, being rearwardly movable longitudinally of said trigger member by the action of gravity, to retain said trigger member against downward pivotal movement, and a pair of spaced rearwardly projected extensions on said one end of the trigger member, said jaw, on pivotal movement in one direction toward a set position, engaging one of said extensions and pivotally moving said trigger member to said upper position, and said jaw, on initial movement thereof in an opposite direction, being engaged and held by said second extension in a set position.

6. In an animal trap comprising a base, a spring actuated pivoted jaw, means for latching said jaw in a set position including a trigger member pivoted at one end on the base, a bait member adapted to rest on said base and guidably supported on the other end of said trigger member, with one of said members having a slot therein formed with longitudinally and vertically extending portions, a lateral projection on the other of said members slidably movable in said vertically extending slot portion on up and down pivotal movement of said trigger member, and movable in said longitudinally extending slot portion on rearward movement of said bait member relative to said trigger member, said bait member, when said trigger member is in an uppermost pivotally moved position relative to said bait member, being inclined upwardly and forwardly so as to be rearwardly movable by the action of gravity, with the projection in said longitudinally extending slot portion holding the trigger member against downward pivotal movement, a first rearward extension on said one end of the trigger member adapted to be engaged by said jaw, on pivotal movement thereof in one direction toward a set position, to pivot said trigger member to said uppermost position, and a second rearward extension on said one end of said trigger member spaced above said first extension and adapted to hold said jaw in a set position.

7. In an animal trap comprising a base, a spring actuated jaw, a bait member having a bait holding portion and an upright channel shaped portion adapted to rest on said base, an upright trigger member pivoted at one end on said base, with its other end movably positioned within said channel portion, said channel portion having a pair of oppositely arranged slots therein, with each of said slots having an upright slot portion and a longitudinally extended slot portion open to the upper end of said upright slot portion, a lateral projection on said trigger member slidably movable in said slots, said projection being movable in said upright slot portions on pivotal movement of said trigger member about said one end thereof, said bait member, when said projection is at the junction of said upright and longitudinally extended slot portions, being inclined upwardly and forwardly so as to be moved rearwardly by gravity to position said projection within said longitudinally extended slot portions to releasably hold said trigger member against downward pivotal movement, and coacting means on said trigger member and on said jaw providing for an upward pivotal movement of said trigger member as said jaw is moved to a set position and for a latching of said jaw in a set position.

8. An animal trap comprising a base and a spring actuated jaw, a bait member having a bait holding portion and a channel portion adapted to rest on said base, an upright trigger member pivoted at one end on said base, with its other end pivotally movable within said channel portion, said trigger member having a slot therein with an upright portion and a longitudinally extended portion open to the lower end of said upright slot portion, a pin member supported on the sides of said channel portion and slidably movable in said slot, said pin member being movable in said upright slot portion on pivotal movement of said trigger member, said bait member, when the pin member is at the junction of said upright and longitudinally extended slot portions, being inclined upwardly and forwardly so as to be movable rearwardly by gravity to position the pin within said longitudinally extended slot portion to releasably hold said trigger member against downward pivotal movement, and coacting means on said trigger member and on said jaw providing for an upward pivotal movement of said trigger member as the jaw is moved to a set position, and for a latching of said jaw in a set position.

9. In an animal trap comprising a base, a spring actuated jaw, a bait member having one portion movably supported on said base, a trigger member pivoted at one end on said base, and having the other end thereof extended longitudinally of said bait member adjacent to said one portion, a pin and slot connection between said one portion and the other end of said trigger member adapted to provide for a pivotal movement of said trigger member relative to said bait member, and for a movement of said bait member longitudinally of said trigger member when said trigger member is in an upper pivotally moved position, said trigger member at one longitudinally moved position of said bait member being releasably held against downward pivotal movement by said pin and slot connection, and coacting means on said trigger member and on said jaw providing for an upward pivotal movement of said trigger member, as said jaw is moved to a set position, and for a latching of said jaw in a set position.

HENRY J. PETERSON.

REFERENCES CITED

The following references are of record in the file of this patent:

UNITED STATES PATENTS

| Number | Name | Date |
|---|---|---|
| 615,562 | Lawler | Dec. 6, 1898 |
| 1,039,001 | Winkler | Sept. 17, 1912 |
| 1,333,875 | Pokorny | Mar. 16, 1920 |
| 1,407,096 | Spencer | Feb. 21, 1922 |
| 1,891,737 | Stilson | Dec. 20, 1932 |
| 2,031,520 | Zahm et al. | Feb. 18, 1936 |
| 2,065,701 | Houtsinger | Dec. 29, 1936 |
| 2,068,508 | Orr | Jan. 19, 1937 |
| 2,159,483 | Huebner et al. | May 23, 1939 |
| 2,174,929 | Slutz | Oct. 3, 1939 |

FOREIGN PATENTS

| Number | Country | Date |
|---|---|---|
| 309,895 | Italy | July 19, 1933 |
| 97,863 | Sweden | Jan. 23, 1940 |